Sept. 6, 1960 W. L. MORRISON 2,951,608
INSULATED RECEPTACLE
Filed Dec. 8, 1958 2 Sheets-Sheet 1
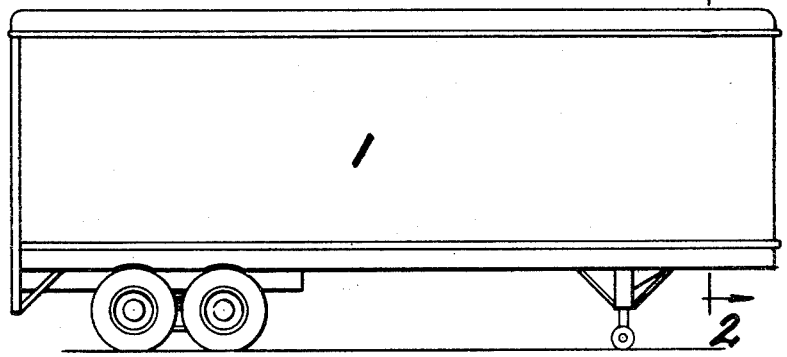
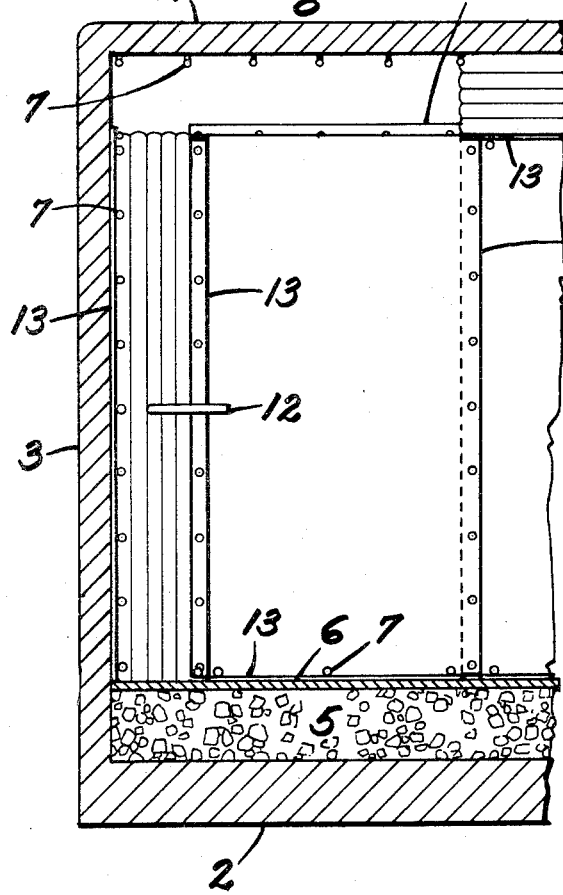
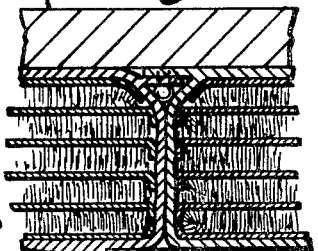
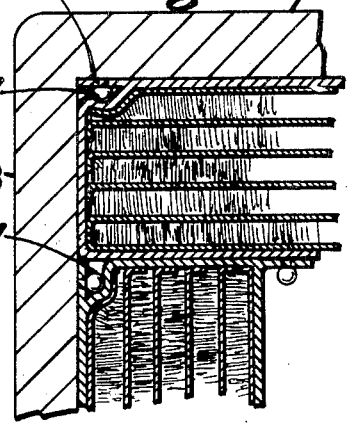
INVENTOR.
WILLARD L. MORRISON
BY PARKER & CARTER
ATTORNEYS Sept. 6, 1960   W. L. MORRISON   2,951,608
INSULATED RECEPTACLE
Filed Dec. 8, 1958   2 Sheets-Sheet 2
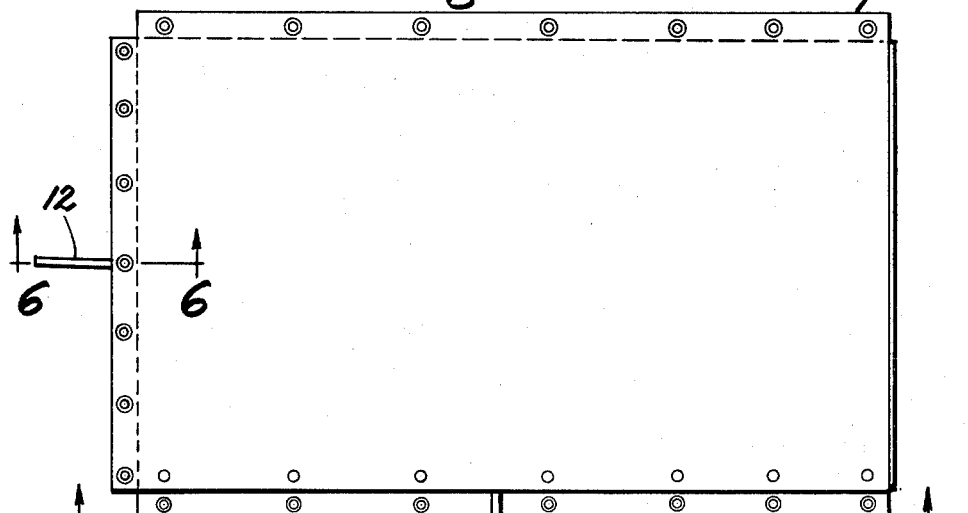
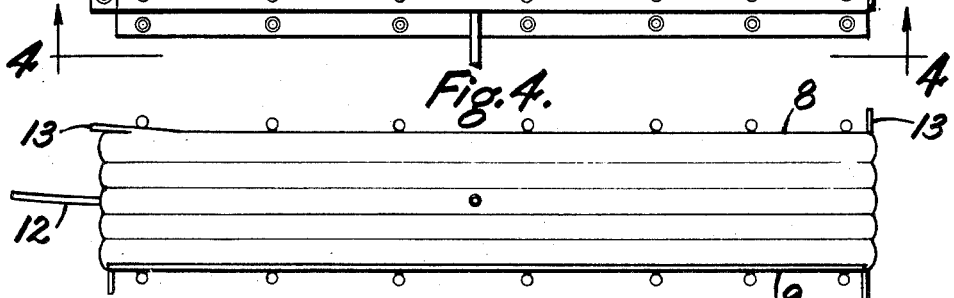
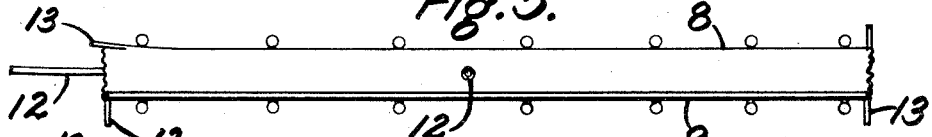
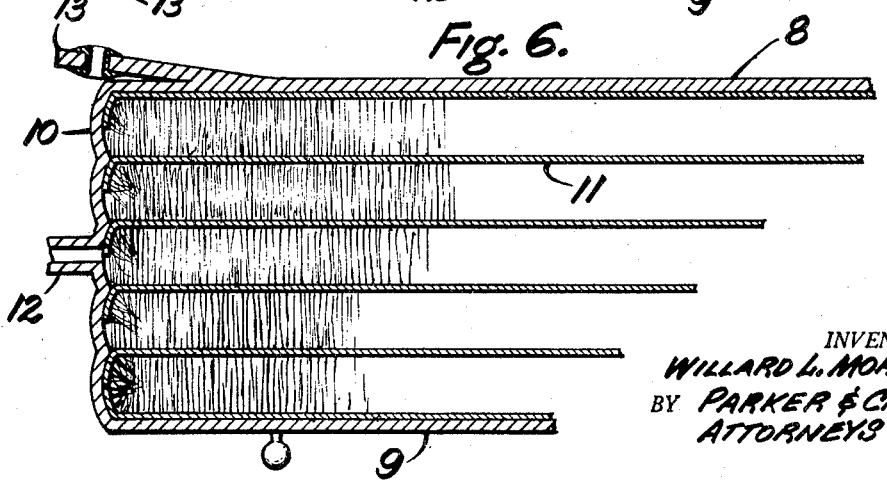
INVENTOR.
WILLARD L. MORRISON
BY PARKER & CARTER
ATTORNEYS

2,951,608
INSULATED RECEPTACLE

Willard L. Morrison, Lake Forest, Ill., assignor to Liquefreeze Company, Inc., New York, N.Y., a corporation of New York Filed Dec. 8, 1958, Ser. No. 778,851

4 Claims. (Cl. 220—9)

This invention relates to improvements in insulating containers for the storage and shipment of frozen food and the like and has for one object to provide insulation effective independent of variations in temperature for the storage of food-stuffs and the like which may be stored at temperatures far below zero degrees F. For convenience, it is illustrated as applied to an automotive motor vehicle but may equally well be used for fixed installations, railroad cars, ships, airplanes and the like.

Another object is to provide insulation which will be independent of and not subject to damage from torsional strains, vibration, thermal differences or aging.

Another object is to provide an insulation which may be easily and conveniently applied temporarily and may thereafter be removed for reuse.

Another object is to provide insulation which will maintain its effectiveness in case some elements are damaged.

Other objects of the invention will appear from time to time throughout the specification and claims.

My invention is illustrated more or less diagrammatically in the accompanying drawings, wherein—

Figure 1 is a side elevation of an automotive vehicle with which my invention may be used;

Figure 2 is a partial section along the line 2—2 of Figure 1;

Figure 3 is a plan view of one of the insulating units which may be assembled to complete the insulation of a vehicle body;

Figure 4 is a section along the line 4—4 of Figure 3 showing an insulating element in expanded form;

Figure 5 is a view similar to Figure 4 showing the insulation unit in compacted form;

Figure 6 is a section on an enlarged scale along the line 6—6 of Figure 3;

Figure 7 is a section on an enlarged scale through the abutting edges of two adjacent insulating units;

Figure 8 is a section on an enlarged scale showing a slightly different positioning of the insulating units.

Like parts are indicated by like characters in the course of the specification and drawings.

The automotive vehicle body 1, has a bottom 2, side walls 3, top wall 4. The bottom may, if desired, be insulated by fixed, built in load bearing insulation 5, such as balsa wood or dyalite having a non heat conductive tread plate 6. Suitably placed on roof and wall of the vehicle are a multiplicity of buttons 7 which may for example be of the general type long used for holding carriage and automobile curtains, awnings and the like. These buttons are provided for the purpose of anchoring a multiplicity of separate, inflatable, insulating elements in place. These elements comprise back and front walls 8 and 9 and side walls 10, all preferably of elastomeric or similar gas tight material. Inside these elements are a multiplicity of foraminous sheets 11, parallel with walls 8, 9 and attached at their edges to the side walls 10. Held between these foraminous sheets and between them and the walls 8, 9 are a multiplicity of cotton or similar, preferably uniform fibers, cemented in place at their ends so that when the insulating elements are inflated, the fibers will be held under tension parallel with and spaced from one another and perpendicular to walls 8, 9 holding the walls 8, 9 and the foraminous sheets in spaced apart general parallelism. Each body may be inflated through an air tube 12, provided with the usual type of Schroeder tire valve, the details of which are not illustrated and form no part of the present invention.

Extending from the walls 8, 9 and spaced around the entire peripheries of each unit are tabs 13 preferably apertured to engage the buttons 7.

These separate air tight insulating bags or units may be buttoned in place where desired within the vehicle and may cover all the walls. Since they are soft and loose when not inflated, they can be easily installed. The tabs on the sides away from the wall of the vehicle may be buttoned together to hold the units in place to provide a closely assembled structure. The inflation tubes 12 will be long enough to extend out beyond one or the other face of each unit. Each unit will in its turn be inflated from the collapsed position shown in Figure 5 to the expanded position shown in Figure 6. Inflation tubes 12 will be tucked into the spaces between the units and this can be done because the units are flexible and expand and contract under pressure.

Under these circumstances, the entire insulated chamber is surrounded by insulating units. The insulation is air and cotton fibers, neither of which are good conductors, and the cotton fibers inhibit convective air circulation. Thus, the entire insulation assembly is built up of a series of entirely separate air bags tied together front and rear. The advantage in tying together both front and rear and bottom and top to floor and roof bags in inflated position is that if a single bag is punctured or by accident not inflated the bags around it will hold it out in the correct position and as it is pulled out into that correct position as a result of the inflation of the bags around it, air will enter through the valve and permit expansion to some extent. If on the other hand, the bag is deflated, punctured, or the like, the walls will be held apart or will remain in the extended position giving the necessary insulating effect. The buttoning together of all of the bags results in a continuous wall and uniform position of the bags whether inflated or deflated and prevents displacement of the bags either in inflated or deflated condition as a result of movement of the vehicle or contact with its contents.

Each bag or unit may be easily separately inflated under many conditions but a very large amount of pressure is sufficient under other conditions. It may be desired to inflate the bags to high pressure so that they may stand the shock of load. They can be inflated by pressure from an air paddle or by pump—hand or power—as the case may be. If for one reason or another, very high pressures are required, it will under some circumstances be desirable to reinforce the cotton fibers with cords spaced about the unit area.

Since the insulation is entirely built up of a series of separate, rectangular bags, any desired size or shape of the insulated chamber may be selected. Thus a portion of the container may be insulated or the bags may be assembled, suspended on a frame, portably mounted in the chamber, to give different size compartments. Once the bags are inflated, the inflation tube will be tucked in out of sight and out of the way.

Figures 7 and 8 illustrate in detail the relationship between abutting bags. The foraminous sheets prevent excessive lateral expansion of the bag or unit but since they are not absolutely rigid some expansion takes place to insure tight contact of the abutting edges. This occurs whether they abut edge to edge as shown in Figure 7 or edge to side as shown in Figure 8.

In the extended position the cotton is at a selected density to give a maximum K factor whereas in the collapsed condition the K factor is greatly lessened but the space available for non-refrigerated service is considerably greater.

I claim:

1. In combination, a shipper container, a removable insulating lining therefor including a plurality of inflatable bags in contact with one another to define a cold storage chamber, insulating means contained within each bag comprising a multiplicity of separate, independent cotton fibers anchored at opposite ends and held under tension by the inflation of the bag.

2. In combination, a shipper container, a removable insulating lining therefor including a plurality of inflatable bags in contact with one another to define a cold storage chamber, insulating means contained within each bag including a plurality of spaced foraminous sheets parallel with the front and back faces of the bag, cotton fibers attached at opposite ends to the sheets held under tension and in spaced apart position by the inflation of the bag.

3. In combination, a shipper container, a removable insulating lining therefor including a plurality of air tight inflatable insulating bags, a fibrous collapsible insulating body contained within each bag, each bag having a separate inflation stem, the insulating material comprising a multiplicity of cotton fibers arranged side by side, spaced apart and under longitudinal tension when the bag is inflated.

4. In combination, a shipper container, a removable insulating lining therefor including a plurality of air tight inflatable insulating bags, a fibrous collapsible insulating body contained within each bag, each bag having a separate inflation stem, the insulating material comprising a multiplicity of cotton fibers arranged side by side, spaced apart and under longitudinal tension when the bag is inflated, a plurality of parallel foraminous sheets to which the ends of the fibers are anchored, the sheets extending throughout the entire cross section of the bag and being parallel to the front and rear faces of the bag.

References Cited in the file of this patent

UNITED STATES PATENTS

| | | |
|---|---|---|
| 607,268 | Nielsen | July 12, 1898 |
| 746,414 | Van Fleet | Dec. 8, 1903 |
| 1,675,957 | Reeves | July 3, 1928 |
| 2,663,448 | Spiegelhalter | Dec. 22, 1953 |
| 2,674,206 | Scott | Apr. 6, 1954 |
| 2,697,229 | Krueger | Dec. 21, 1954 |
| 2,797,903 | Urban | July 2, 1957 |